UNITED STATES PATENT OFFICE.

EMIL FLEISCHER, OF WIESBADEN, GERMANY.

PROCESS OF MAKING ALUMINATES OF ALKALIES.

SPECIFICATION forming part of Letters Patent No. 472,668, dated April 12, 1892.

Application filed June 11, 1891. Serial No. 395,915. (No specimens.)

*To all whom it may concern:*

Be it known that I, EMIL FLEISCHER, a subject of the Emperor of Germany, resident at Wiesbaden, Germany, have invented new and useful Improvements in the Manufacture of Aluminates of Alkalies, of which the following is a specification.

The present invention relates to the production of alkali aluminates, alumina, caustic alkalies, and carbonates (soda, potash,) by a special method, whereby alkali aluminate (potash or soda alumina) is obtained from aluminous substances by means of alkali sulphates, &c. This alkali-aluminate process will therefore affect both the manufacture of alumina and its compounds as well as that of caustic alkalies and carbonates (soda, potash) to such extent as to constitute it the starting-point in these industries.

It has been frequently attempted to obtain sodium aluminate by fusing bauxite and sulphate of soda (instead of soda, which is usually employed) with the addition of coal; but as iron is always present in bauxite, and mostly in considerable quantity, the formation of liquors containing much sulphur and colored deep black by dissolved iron sulphide has rendered the adoption of such process impracticable. As a matter of fact, in the treatment of bauxite with sulphates of the alkalies and coal not only are inky-black liquors obtained containing along with iron sulphide much alkali sulphide, but the yield of aluminate, as stated by Muspratt, is scarcely half that obtained by the soda process. Moreover, the fused mass containing iron seriously attacks the furnace or melting-pot, thus absorbing many impurities and necessitating frequent repairs.

If alumina be ignited with alkali sulphate and oxide of iron, with the addition of coal, sulphide of iron and alkali aluminate are formed; but the process is not sufficiently satisfactory for practical purposes. A considerable quantity of the alkaline sulphide which forms combines with the sulphide of iron with such tenacity that the compound thus produced will not decompose even in the presence of a large excess of iron. If such an ignited mass be lixiviated, an inky-black solution of a double sulphide of iron and alkali is produced, which is very troublesome to filter, and if the iron be separated from such an undesirable solution (which is not a simple matter) still a considerable quantity (often exceeding thirty per cent.) of alkaline sulphides (but only a little alkaline aluminate) is retained in solution.

From the above it is evident that it is in practice out of the question to treat aluminiferous substances by means of alkali sulphate and carbonaceous material with the addition only of iron or its oxides, or to treat ferruginous bauxite with only alkaline sulphate and carbonaceous material. In either case inky-black liquors are obtained, containing in solution not only sulphide of iron, but also large quantities of alkaline sulphide, while the yield of alkaline aluminate is very low. The tendency of alkaline sulphide (forming on ignition) to combine with sulphide of iron is actually so great that even an excess of alumina, which might assist the formation of aluminate, does not overcome these drawbacks. The addition of magnesia is equally ineffectual to prevent the formation of the troublesome double sulphide compound. As this sulphureted alkali and iron compound forms on treating bauxite with alkaline sulphates, not only if iron is purposely added, but likewise when already present, as it always is in bauxite, it would be absolutely impossible, as above indicated, to employ alkaline sulphates for this treatment had I not discovered means for effectually preventing the formation of the said noxious compound. This consists in the employment of lime, which is added in the form of quicklime or carbonate to the mass to be ignited, and causes part of the alkaline sulphide to exchange its sulphur for the oxygen of the lime. While the calcium sulphide thus produced combines with the iron sulphide to form a substance quite insoluble in water, the alkali liberated is rendered available for the formation of aluminate. If, therefore, such mass after being heated together with the added lime be dissolved in water, the whole of the iron sulphide (partially combined with calcium sulphide) remains undissolved. A perfectly-colorless liquor is thus obtained, which can be readily filtered, and contains a high percentage of alkali aluminate, but an exceedingly small amount of alkaline sulphide.

It might easily be supposed that by employing sufficient lime it would be rendered unnecessary to add iron, as, moreover, the lime might act as a desulphurizer, as in the Leblanc process; but the presence of the alumina absolutely bars the addition of such a large quanty of lime as would be required for perfect desulphurization. During the heating the alumina combines with the lime to form insoluble lime aluminate, a great portion of the lime being thereby withdrawn from the alkali desulphurization, which necessitates a very large excess of lime, in order to effect even a tolerable desulphurization. I have found that one and two-thirds ($1\frac{2}{3}$) molecules of lime are capable of desulphurizing a mixture of one molecule of pure alumina and the same quantity of alkaline sulphate with an addition of carbonaceous material; but so much lime aluminate was thus formed that scarely half of the alumina used was contained in the alkali-aluminate liquor. This tendency of the lime and alumina to combine is diminished by the presence of silica; but this is of no advantage, as it requires so much lime, of which it partly robs the alumina. If, however, the lime does not alone form the chief desulphurizer, but shares this function with the iron, by adding such a quantity of lime that a part of it prevents the formation of the objectionable compound of iron sulphide and alkali sulphide, while the remainder of the lime combines with the silica of the bauxite, the lime will serve a double purpose without appreciably diminishing the yield of alkali aluminate.

My invention is based upon the discovery that by a certain regulated addition of lime and iron in the treatment of aluminiferous substances with alkaline sulphates or sulphides and coal or other carbonaceous material liquors may be obtained wherein the iron sulphide formed is insoluble, yielding a high percentage of alkali aluminate. In order to solve the problem of "how much lime is at least necessary to prevent the formation of the sulphureted compound of iron and alkali," I have performed many experiments with a mixture of equivalent quantities of pure alumina, alkali sulphate, and iron (together with coal) with varying additions of lime. These experiments showed that for every molecule of alkali sulphate (therefore of alumina also) at least one-fourth ($\frac{1}{4}$) molecule of lime or chalk must be added in order that the noxious iron compound may not form, but that colorless liquors may be obtained. It is true that pure liquors can be obtained if the quantity of lime be increased without the excess being combined with silicic acid; but the yield of aluminate is thereby more or less seriously diminished. As in my process all the sulphur of the alkali is given up to the iron, it is evident that for every molecule of alkali sulphate but one molecule of metallic iron or the corresponding amount of oxide (including the iron contained in the crude material) is required. A large excess of iron has a deleterious effect, because uncombined oxide of iron combines with alkali, thus diminishing the quantity of aluminate formed. According to my experiments, to combine silica by means of lime two molecules of lime are required for three molecules of silica, or just so much chalk as the silica contained in the mixture to be ignited weighs. As the alkali aluminate, which forms during the heating and is soluble in water without decomposition, is constituted according to the formula $R_2OAl_2O_3$, not more than one molecule of alkali sulphate or alkali sulphide must be added for every molecule of alumina. Hence the following general rule: "Add to the aluminous substance (clay or bauxite) for every molecule of alumina one molecule of alkali sulphate and insure by the addition of iron or its oxides that fully one molecule of iron (including that already contained in the clay) be present for the formation of FeS for every molecule of alkali sulphate or alumina. The lime or chalk is to be reckoned as two molecules for every three molecules of silica, and a further quarter molecule of lime or chalk is to be added for every molecule of alumina; or, what is much the same, when adding chalk add as much as the silicic acid in the mass weighs, plus a quarter of a molecule of chalk for every molecule of alumina." These mixing proportions (with the addition of the necessary charcoal) yield the best results; but they may be somewhat varied, as before mentioned, in reference to lime without very greatly deteriorating the result.

I now proceed to describe my process for the manufacture of alkali aluminate (potash or soda alumina) from aluminous substances (clay, bauxite, &c.) by means of alkali sulphate, iron, (or its oxides,) lime, (chalk or limestone,) and carbonaceous matter. All the silica (sand) which can be washed out is preferably so removed from the aluminous substance. The amount of alumina ($Al_2O_3$) contained in the substance to be treated is first to be estimated, as well as the iron, silica, and lime, when present in any considerable quantity. The presence of small quantities of magnesia in the clay is as harmless to the aluminate process as are small quantities of alkalies, phosphoric acid, or heavy metals and compounds thereof. Having completed the analysis, the ingredients for the mixture are weighed and finely ground to form an intimate mixture thereof.

In accordance with the above-mentioned rule the best mixing proportions for one hundred parts, by weight, of alumina ($Al_2O_3$) contained in the clay or bauxite are the following. (Respecting the figures for sulphate of potash and soda, it is almost unnecessary to remark that they refer to the analogous aluminates to be obtained by means of the one or the other sulphate.) For one hundred parts of alumina ($Al_2O_3$) add sulphate of potash one hundred and seventy-five parts, by weight, or sulphate of soda, (reckoned as anhydrous,) one hundred and forty parts, by weight; iron oxide, (or other oxygen compounds thereof or metallic iron containing an equivalent quantity of iron,) including that contained in the clay, &c., eighty parts, by weight; charcoal, (for reducing at least three equivalents per equivalent of $Al_2O_3$,) forty parts, by weight; carbonate of lime, (exclusive of an amount equal to the weight of the silica,) one-fourth ($\frac{1}{4}$) equivalent per equivalent of $Al_2O_3$, twenty-five parts, by weight.

The charcoal may be employed in the form of carbonizing substances, (sawdust, &c.) The carbonate may be replaced by an equivalent quantity of quicklime; but in that case for every part, by weight, of silica there must be added fifty-six per cent. of quicklime. For instance, if the bauxite contain twenty parts, by weight, of silica to one hundred parts, by weight, of alumina, twenty parts of chalk (corresponding to 11.2 parts CaO) should be added besides the twenty-five parts of chalk, (or fourteen parts of quicklime.) Of impure substances—such as limestone, &c.—it will of course be necessary to use more. A somewhat larger quantity of lime (as already mentioned) would not do any great practical harm, whereas with the given quantity of iron black liquors (which must be avoided) would result from the use of too little chalk. It is evident that a clay containing the given quantity of iron (molecular equivalent to the alumina) per hundred parts, by weight, of $Al_2O_3$ requires no additional iron; but if, on the other hand, clays containing much less iron (containing even fifteen per cent. of silica) are to be treated with only lime or chalk (with the addition, of course, of alkali sulphate) as much lime will suffice as will make the total molecules thereof and of the metallic iron together equal to about one and two-thirds ($1\frac{2}{3}$) of the molecules of alumina present. Even pure alumina free from iron requires at least one and two-thirds ($1\frac{2}{3}$) of a molecule of lime to produce aluminate liquors not too sulphurous, so that in a certain degree (with a deficiency of iron) these molecular proportions indicate the minimum for combining the sulphur. Clays containing much silica of course require more lime. It is evident from these facts (which I have ascertained from experiment) that should the iron already present in the clay be insufficient it is always best to add the lime and iron simultaneously in accordance with the above given table and in conformity with the general rule "like number of molecules of alumina and iron," as a large amount of lime reduces the yield of aluminate.

Before passing to the further description of the above normal or standard mixture I would remark in regard to the quantity of alkali sulphate to be added that, as in the process of heating, the alumina forms only a monobasic compound with the alkali, and thus produces a compound soluble in water without decomposition—e. g., $K_2OAl_2O_3$—the employment of more alkali sulphate than is equivalent to the alumina is unnecessary—in fact, it is harmful—because very sulphurous liquors are easily produced thereby. If it be desired to dissolve out the alumina from the ignited mass as completely as possible, a little carbonate of potash or soda is added to the lixiviating water, which becomes caustic, owing to the quicklime produced, and thus dissolves any alumina that might become soluble. These precautions will very soon be found superfluous. Of course alkali thiosulphates or sulphides may be used in place of sulphates. The substances well ground and mixed may now be ignited in the form of powder (covered with a little charcoal) either in a reverberatory furnace or in closed vessels. The temperature does not require to exceed a moderate red heat. Too great a heat (white heat) causes the mass to partly melt instead of lightly fritting and renders the lixiviation more difficult. Oxidation of the sulphide of iron formed during the heating and cooling (which is preferably conducted in closed vessels) should be avoided. When working with reverberatory furnaces, the mass should not be unnecessarily raked about, nor should the layer be too thick, as the heating should be uniform and thorough. Half an hour is sufficient for the reduction, reckoning from the time the charge is thoroughly red-hot. The finished mass is then placed in closed iron vessels to cool. The lixiviation may be performed in the manner usual in soda-works with cold or hot water. The clear or filtered liquor of alkali aluminate contains, when the working is properly attended to, but little alkali sulphide and traces of lime. The latter can be precipitated by adding a little carbonate of potash or soda without precipitating alumina, which is not precipitated from aluminate solution by neutral alkaline carbonates. If it be desired to dispose of the aluminate liquor as such, and therefore to eliminate the small quantity of sulphur it may contain without introducing carbonic acid, this may be done by adding freshly-precipitated ferrous oxide or ferric hydrate, provided the sulphur is not more highly oxidized, (by chlorine, &c.) For most purposes, however, the small quantity of sulphur in the aluminate liquor will be innoxious.

To obtain alumina and alkali carbonates, (soda, potash,) the colorless solution of aluminate is saturated at nearly boiling-point with carbonic acid, whereby the sulphur is so completely driven off as sulphureted hydrogen that only the least traces of it are found in the resulting soda or potash solution. It is noteworthy that no thiosulphates are generated in this aluminate process. The carbonic acid for saturating is produced by heating carbonate of lime, (limestone,) the burnt lime being used not only for adding to the charge, but for treating the leached residues and for various other purposes.

Alumina precipitated in a granular condition by means of the hot saturation can be filtered and washed upon suction-filters, and is then perfectly free from iron and silica—in fact, so pure that it may be employed for the production of aluminium. The resulting soda or potash solution is also characterized by its purity so long as the alkali sulphate used for the charge contained no material impurity of alkali chlorides and which, if present, partially volatilize during the ignition. Much more than ninety per cent. of pure soda or potash is obtained by the aluminate process from the equivalent quantity of sulphate used. A small proportion of alkali, however, remains behind as silicate with alumina and lime in the insoluble residue.

If it be desired to obtain caustic alkali liquor directly from the aluminate solution, the alumina may be precipitated by lime, according to Lowig's well-known process. The precipitated lime aluminate, after being dissolved in hydrochloric acid and having the alumina precipitated therefrom with aluminate liquor, is suitable for the production of easily-soluble (gelatinous) alumina. If, however, the whole object is to produce caustic alkali and not gelatinous alumina, it is simpler to saturate alkali-aluminate solution and causticize the resulting solution of soda or potash by means of lime in the usual way. As lime aluminate is tribasic, only a third the quantity of lime is required. As the alkali-aluminate liquor contains equivalent quantities of alumina and alkali, it yields alum direct by saturation with sulphuric acid without any excess of alkali sulphate. Of course the alumina salts can be obtained direct by dissolving the precipitated alumina in the respective acid. If desired to first extract the small quantity of alkali still contained in the alumina, it is digested with a little dilute hydrochloric acid.

What I claim as my invention, and desire to secure by Letters Patent, is—

1. The improvement herein set forth in the art of manufacturing alkali aluminates from aluminous substances and alkaline sulphates, alkaline thiosulphates, or alkaline sulphides, consisting in mixing these ingredients with iron and lime and subjecting the whole to the action of heat in the presence of a reducing agent, the quantities of iron and lime being so proportioned, as herein described, that the sulphur present is taken up by the iron and the silicic acid is taken up by the lime, while the latter is in excess in order to prevent the formation of soluble combinations of sulphide of iron with the alkalies.

2. The improvement herein set forth in the art of manufacturing alkali aluminates from aluminous substances and alkaline sulphates, alkaline thiosulphates, or alkaline sulphides, consisting in mixing these ingredients with iron and lime and subjecting the whole to the action of heat in the presence of a reducing agent, the quantities of iron and lime being proportioned as herein described.

In testimony whereof I have signed my name to this specification in the presence of two subscribing witnesses.

EMIL FLEISCHER.

Witnesses:
FRANZ HASSLACHER,
FRIEDRICH QUEHL.